United States Patent [19]

Saarem et al.

[11] 4,230,142
[45] Oct. 28, 1980

[54] VENT/VACUUM BREAKER FLOAT VALVE ASSEMBLY

[75] Inventors: Myrl J. Saarem, Carson City; Philip E. Parsons, Silver Springs, both of Nev.

[73] Assignee: Richdel, Inc., Carson City, Nev.

[21] Appl. No.: 969,174

[22] Filed: Dec. 13, 1978

[51] Int. Cl.$^3$ ............................................. F16K 31/24
[52] U.S. Cl. .................................... 137/202; 137/375; 137/445
[58] Field of Search ............... 137/202, 445, 434, 375, 137/377

[56] References Cited

U.S. PATENT DOCUMENTS

| | | | |
|---|---|---|---|
| 1,081,019 | 12/1913 | Conwell | 137/202 |
| 2,425,070 | 8/1947 | Nicolette | 137/202 |
| 3,073,333 | 1/1963 | Cherrington | 137/202 |
| 3,168,103 | 2/1965 | Kochaver | 137/202 |
| 3,599,659 | 8/1971 | Nuter | 137/445 X |

*Primary Examiner*—Alan Cohan
*Attorney, Agent, or Firm*—Keith D. Beecher

[57] ABSTRACT

A vent/vacuum breaker float valve assembly is provided which includes a float sub-assembly that moves a seal into engagement with a vent port seat when liquid enters the body of the valve to seal the inner valve chamber when all the air trapped in the chamber has been exhausted. The valve assembly also includes a poppet valve sub-assembly which closes and remains closed so long as the valve chamber is pressurized. However, when the liquid is removed from the valve chamber both the vent valve and the poppet valve open to the atmosphere to break the vacuum within the chamber and to allow air to replace the draining liquid.

3 Claims, 2 Drawing Figures

VENT/VACUUM BREAKER FLOAT VALVE ASSEMBLY

BACKGROUND

The valve assembly of the invention finds particular although not exclusive application in solar panel installation systems. In such installation systems, a problem occurs when the system is filled with water or drained. Recurring filling and draining operations are required, for example, in environments where a likelihood of freezing exists. During the filling of a typical solar panel installation, the high point in the system has a tendency to trap air. It is essential, however, that such air be vented out of the system to assure efficient operation of the system with a maximum amount of liquid. Moreover, when a typical solar panel installation is drained, there is a tendency for vacuum to be created in the system which slows down and prevents complete draining.

The valve assembly of the present invention performs the dual function of venting the solar panel system during filling so that all air trapped in the system is permitted to escape to the atmosphere; and which also breaks any vacuum in the system during draining, and exposes the interior of the system to the atmosphere, so as to facilitate timely and complete draining of the system.

DETAILED DESCRIPTION OF THE ILLUSTRATED EMBODIMENT

Figure 1:
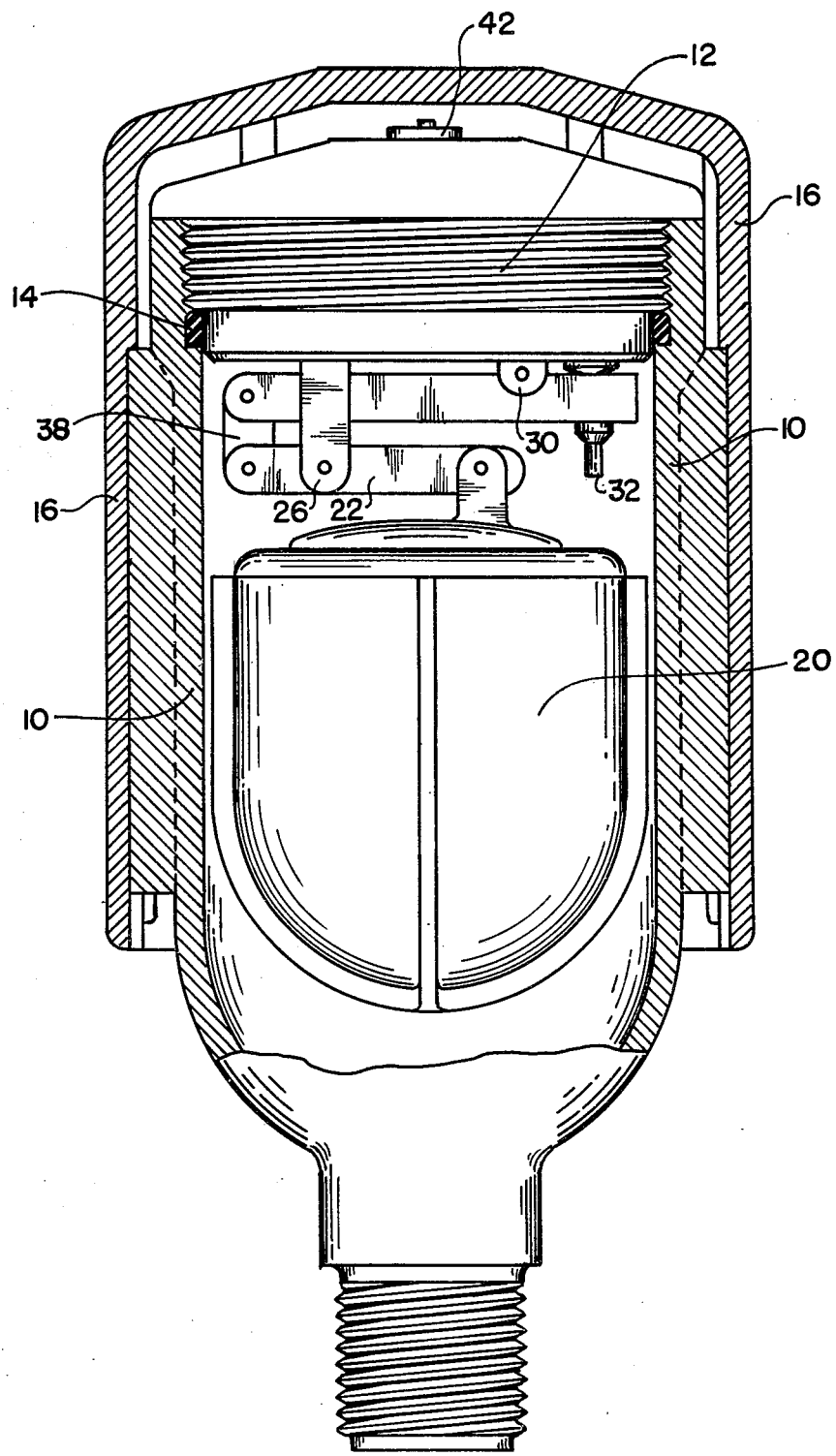
FIG. 1 is a side section of a combined vent/vacuum breaker float valve assembly constructed in accordance with a presently preferred embodiment of the invention.
Figure 2:
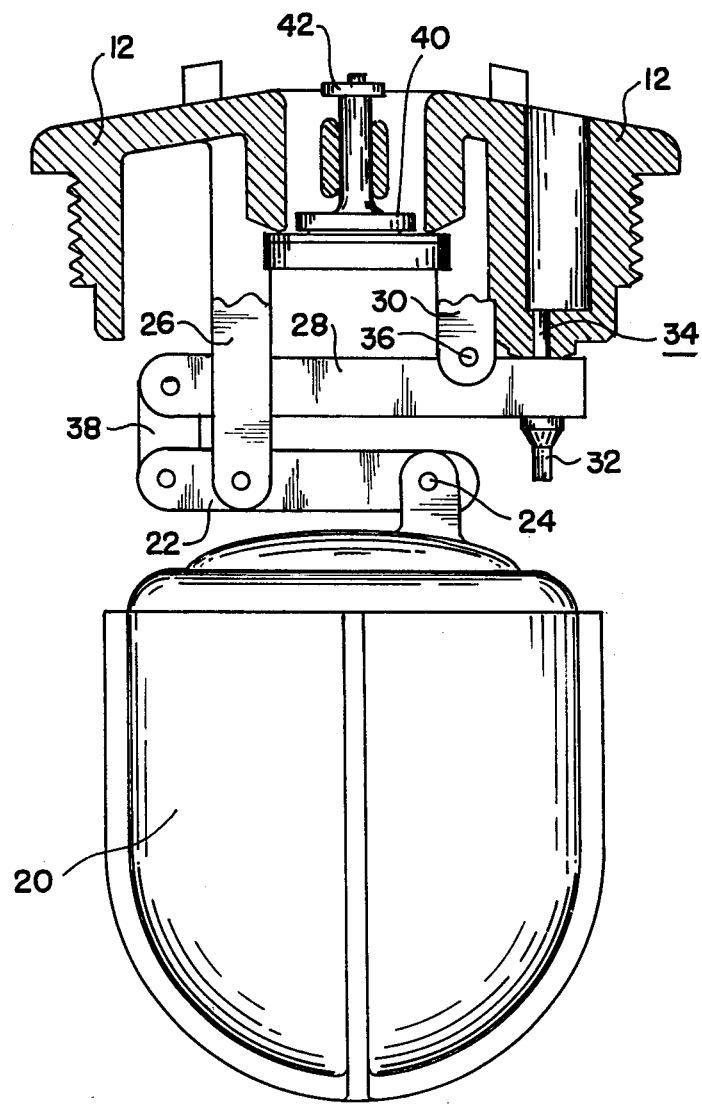
FIG. 2 is a side elevation of a float sub-assembly included in the assembly of FIG. 1, and a sectional view of a poppet retainer valve which is also included in the assembly of FIG. 1.

The valve shown in FIGS. 1 and 2 includes a body 10 which is threaded at one end to permit the valve to be coupled into, for example, a solar panel circulation system. The sub-assembly of FIG. 2 includes a cap 12 which is threaded into one end of body 10, and which encloses the end of the body 10 in a sealed relationship, by virtue of an O-ring 14. The valve may be enclosed by an appropriate cover, such as cover 16.

The float sub-assembly of FIG. 2 includes a float member 20. A lever 22 is coupled at one end to float 20 through a linkage pivot shaft 24. Lever 22 is pivotally supported by cap 12 by a post 26. A second lever arm 28 is pivotally supported by cap 12 by means of a second post 30. An elastomeric sealing member 32 extends through the right-hand end of lever arm 28. The sealing member engages a vent port 34 in cap 12, when lever 28 is turned in a counterclockwise direction about a pivot pin 36 in the end of link 30. The other end of lever arm 28 is coupled to the left-hand end of lever arm 22 by means of a connecting link 38.

A spring-loaded poppet valve sub-assembly 40 is mounted in cap 12, and is retained in the cap by means of an appropriate retainer 42. The poppet valve operates by suction or gravity.

When liquid enters the valve chamber defined by body 10, the float 20 rises, and this action moves the levers 22 and 28, and link 38, in a direction to bring the sealing member 32 into contact with the seat of vent port 34 so as to seal the valve chamber.

The poppet valve sub-assembly 40 remains closed so long as the valve chamber is pressurized. During the filling operation, when enough gas accumulates inside the valve chamber to displace enough liquid so that the float 20 is no longer buoyant, the float drops and allows gas to escape through the vent port 34 in cap 12. Again, as the liquid level rises within the valve chamber, the float rises and closes the vent port. This cycle continues until all of the gas is expelled from the system through the vent port 34.

On the other hand, during the draining operation, when liquid inside the valve chamber is removed, both the vent valve and the vacuum breaker poppet valve sub-assemblies open to the atmosphere and allow air to replace the draining liquid. This action, as described above, assures rapid and complete draining of the system during the draining operation.

The cover 16 provides insulation as the chill factor could lower the liquid temperature by as much as 15° F. which, in some instances, could cause freezing. Using a double wall plastic valve, as illustrated in the drawing, minimizes the chances of freezing before the system can drain, as compared with a single wall metal valve.

The invention provides, therefore, a simple, economical, sturdy and durable valve assembly which permits a system to be filled with liquid while venting all air in the system to the atmosphere, and which also permits the liquid in the system to be drained quickly and completely without the creation of any vacuum effects within the system.

It will be understood that although a particular, presently preferred embodiment of the invention has been shown and described, modifications may be made. It is intended in the claims to cover all such modifications which come within the spirit and scope of the invention.

What is claimed is:

1. A valve assembly for venting gas contained in a pressurized liquid system during filling of the system and for breaking any tendency for vacuum effects to be created in the system during the draining of the liquid from the system, said assembly including: a valve body defining an inner chamber and adapted at one end to permit the valve assembly to be coupled to the system during use so that liquid in the system enters the inner chamber; a float assembly; a cap fitted into the other end of the valve body to enclose said other end and to support said float sub-assembly in said inner chamber; sealing means positioned between said cap and said other end of said body; said cap having a vent port extending into said inner chamber; a movable sealing member for selectively closing the vent port; a plurality of levers coupling the sealing member to the float sub-assembly to cause the sealing member to be forced against the vent in sealing relationship therewith as liquid enters the chamber and displaces the float sub-assembly upwardly in the chamber; a spring loaded valve mounted in said cap in position to be closed when the inner chamber is pressurized but to open and break the vacuum effects of the chamber when the liquid therein is drained so as to reduce the internal pressure of the inner chamber; and a cover enclosing the cap and valve body to insulate the valve assembly and reduce the tendency of the liquid within the valve assembly to freeze.

2. The valve assembly defined in claim 1, in which said valve body is threaded at said one end to permit the valve assembly to be coupled to the system, and in which said cap is threaded into the other end of said valve body.

3. The valve assembly defined in claim 1, in which the valve body, cap and cover are composed of a plastic material to provide a double wall plastic assembly.

* * * * *